United States Patent [19]
Justus et al.

[11] Patent Number: 5,106,107
[45] Date of Patent: Apr. 21, 1992

[54] HEAD GASKET HAVING A STAKED FIRE RINGS AND METHOD OF MAKING SAME

[75] Inventors: Thomas J. Justus, Prospect Heights; Ching-Ho Chen, Barrington, both of Ill.

[73] Assignee: Fel-Pro Incorporated, Skokie, Ill.

[21] Appl. No.: 543,158

[22] Filed: Jun. 25, 1990

[51] Int. Cl.$^5$ .............................................. F16J 15/12
[52] U.S. Cl. ........................... 277/235 B; 277/235 R; 29/888.3
[58] Field of Search ............... 277/234, 335 R, 235 A, 277/235 B; 29/888.3

[56] References Cited

U.S. PATENT DOCUMENTS

| | | |
|---|---|---|
| 3,565,449 | 2/1971 | Ascencio et al. |
| 4,331,336 | 5/1982 | Czernik et al. ................... 277/235 B |
| 4,376,539 | 3/1983 | Baldacci .......................... 277/235 B |
| 4,535,996 | 8/1985 | Cardis et al. |
| 4,605,236 | 8/1986 | Tsuchihashi .................... 277/235 B |
| 4,796,897 | 1/1989 | Inciong . |

FOREIGN PATENT DOCUMENTS 2092244 8/1982 United Kingdom ............ 277/235 B

Primary Examiner—William A. Cuchlinski, Jr.
Assistant Examiner—Daniel G. DePumpo
Attorney, Agent, or Firm—Dressler, Goldsmith, Shore, Sutker & Milnamow, Ltd.

[57] ABSTRACT

A head gasket for an automotive engine having an elongated gasket body comprising a metallic core having upper and lower surfaces, with a plurality of spaced generally circular combustion openings defined by the gasket body. A metallic fire ring is disposed in each combustion opening adjacent the peripheral edge of said combustion opening. A plurality of pairs of stakes displaced radially from the upper and lower surfaces of the fire ring overlying and underlying the metallic core floatingly support the fire rings in the associated combustion openings. A method of making such a head gasket is also disclosed.

9 Claims, 2 Drawing Sheets

HEAD GASKET HAVING A STAKED FIRE RINGS AND METHOD OF MAKING SAME

BACKGROUND OF THE INVENTION

Head gaskets, especially those made for diesel engines, are frequently relatively long and narrow and may define as many as six or eight combustion openings. In some such gaskets, special fire rings are used which are simply rings of metal. They are inserted, as by being press fit in place or by being held in place by deformed peripheral portions which are swaged to cause the rings to bear frictionally against the inner peripheral edges of the combustion openings.

Such head gaskets are typically very thin. As such, when they are handled, as by being gripped at opposite ends, they will frequently flex and bow. Because the inserted rings tend to be more rigid than the gasket bodies, often the friction fit will provide insufficient force to retain the portions of the rings along the axis of the gasket body in the combustion opening, thereby causing them to loosen and fall out. Also, during transportation from the manufacturer to the engine assembly plant such rings sometimes loosen and fall out. Replacement of such rings is time consuming and expensive. Sometimes their reinstallation is improperly accomplished resulting in gasketing which is incorrect and potentially damaging to the engine.

It would be of great benefit to provide head gaskets using inserted fire rings with means for avoiding the difficulties and deficiencies of the prior art.

SUMMARY OF THE INVENTION

In accordance with the present invention an improved head gasket for an automotive engine is provided. The head gasket includes an elongated gasket body having a metallic core having upper and lower surfaces, a plurality of spaced generally circular combustion openings defined by the gasket body, each combustion opening having a center, the centers lying along a line extending lengthwise of the gasket body, and a metallic fire ring disposed in each combustion opening adjacent the peripheral edge of the associated combustion opening. A plurality of stakes which are displaced from each fire ring and formed therefrom overlie and underlie the metallic core to floatingly support the fire ring in the associated combustion opening. The stakes may be displaced radially from the upper and lower surfaces of the fire ring.

Preferably the stakes are located at included angles of no more than about thirty degrees about the center of a combustion opening and a straight line which intersects the center of a combustion opening and the lengthwise line at a right angle.

Desirably there are four pairs of stakes on each fire ring, one of each of the pairs being disposed above the upper surface and one of each of the pairs being disposed below the lower surface.

A method of making a head gasket for an automotive engine is also disclosed. The method comprises the steps of providing an elongated gasket body having a metallic core having upper and lower surfaces, a plurality of spaced generally circular combustion openings defined by the gasket body, each combustion opening having a center, the centers lying along a line extending lengthwise of the gasket body, disposing a metallic fire ring in each combustion opening adjacent the peripheral edge of the combustion opening, and forming a plurality of stakes displaced from each fire ring to overlie and underlie the metallic core, thereby to floatingly support the fire ring in an associated combustion opening.

Preferably the forming step comprises forming stakes at included angles of no more than about thirty degrees about the center of a combustion opening and a straight line which intersects the center of the combustion opening and the lengthwise line at a right angle. In a preferred form, the forming step comprises applying staking tools against the upper and lower surfaces of a fire ring and driving the tools thereagainst to displace stakes radially outwardly from the fire ring.

Desirably the forming step also comprises the forming of four pairs of stakes on each fire ring, one of each of the pairs being below the upper surface and one of each of the pairs being below the lower surface of the gasket body.

Further objects, features and advantages of the present invention will become apparent from the following description and appended drawings.

DESCRIPTION OF THE PRESENTLY PREFERRED EMBODIMENTS

Figure 1:
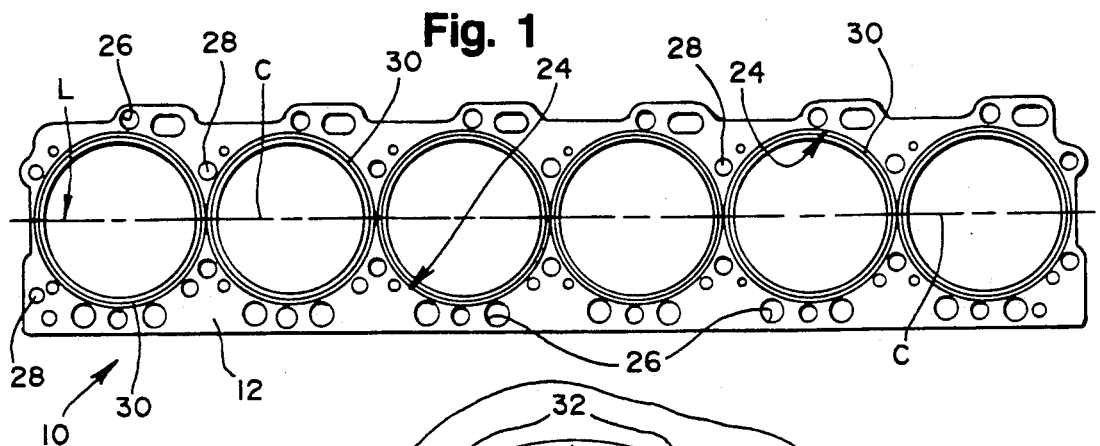
FIG. 1 is a plan view of a head gasket in accordance with the present invention.

Referring now to the drawings, a head gasket 10 is adapted to be disposed between the head and block of an automotive engine, such as a diesel engine. Gasket 10 comprises an elongated main gasket body 12, desirably including a central metallic core 14 (see FIG. 3) having upper and lower main surfaces 16, 18 and facing layers 20, 22 respectively laminated to surfaces 16, 18. Facing layers 20, 22 may comprise asbestos or glass fibers or other fibrous material and may utilize nitrile, neoprene, or polyacrylic elastomers as a binder. Fillers and other ingredients may also be present. Other flat gasket bodies may be used as well, such as, for example, a cold rolled steel core without facing layers, among others.

Gasket 10 defines a plurality of combustion openings 24, as well as water and oil holes 26 and bolt holes 28, all of which may be conventional. Sealing adjuncts such as printed sealants, as of a silicone or other suitable material around the water and oil holes may also be used.

The combustion openings 24 may be generally circular and define centers C. Centers C lie along an axis or line L which intersects the centers and which extends lengthwise of the gasket body. Typically lengthwise line L is a straight line.

Each of the combustion openings 24 has a generally circular, inner peripheral edge closely adjacent which a fire ring 30 is positioned. Typically the outer diameters of such fire rings 30 are substantially the same as the diameters of the combustion openings. Thus the dimension and shape of an inner edge of a combustion opening 24 and of the outer surface of a fire ring 30 are essentially the same or only very slightly different to allow the fire ring to be inserted without distorting or damaging either the fire ring or the main gasket body.

Because press fit fire rings have so readily become dislodged from their positions in combustion openings in the past, other means to hold them in place have been used. One of these has been the swaging or displacement of portions of a metallic fire ring body laterally of the body and into wedging engagement with adjacent surface of the inner peripheral edge of a combustion opening 24.

Nevertheless, because of the relative flexibility of the elongated gasket body as compared to that of associated fire rings, and also because the peripheral edges of the combustion openings tend to be slightly rounded as a result of the die cutting of the combustion openings, fire rings which are so mounted tend to be forced out of the openings, initially most frequently at the regions of the fire rings lying along and in the vicinity of, line L. When that happens, too frequently fire rings fall out, presenting disastrous potential if the rings are not properly replaced before the gasket is installed in an engine.

To avoid those and other problems and difficulties, in accordance with the present invention the fire ring 30, after initially having positioned in the combustion opening, is subjected to a staking operation to provide a series of stakes 32 which project outwardly of the main body of the fire ring and usually in generally radial directions. Stakes 32 are displaced, usually via a staking tool acting in a radial direction, from the body of a fire ring 30 to overlie and underlie the main gasket body and most preferably the metallic core thereof. That is most clearly illustrated by FIG. 3 which shows how a metallic fire ring 30, as disposed in a combustion opening 24, is floatingly supported in the combustion opening adjacent the peripheral edge of the opening 24.

It has been determined that the stakes most preferably are formed and positioned away from the portions of a fire ring which lie along or adjacent to line L. As such if a gasket 10 is handled so that it bows or flexes, those portions of the rings will be permitted to extend out of the curved surface of the gasket body without significantly stressing the supporting stakes 32, as a result of which the fire rings 30 remain in their desired positions in the combustion openings.

Figure 2:
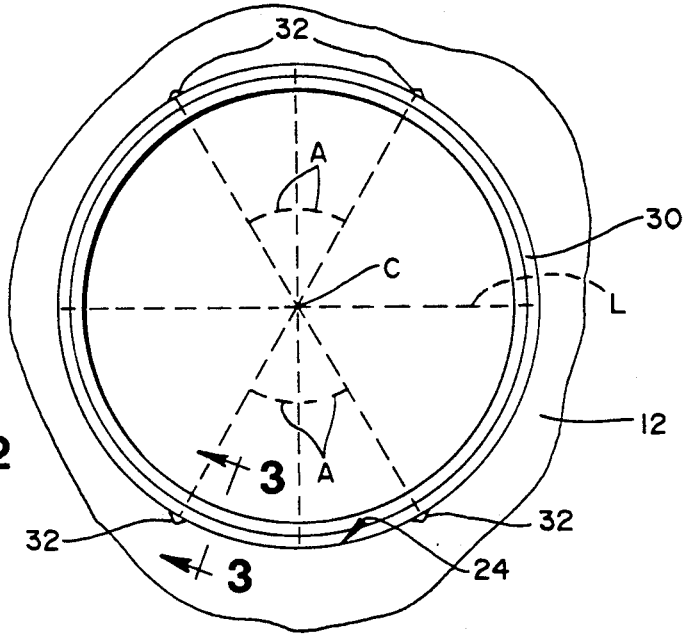
FIG. 2 is an enlarged fragmentary plan view of the gasket of FIG. 1.
Figure 3:
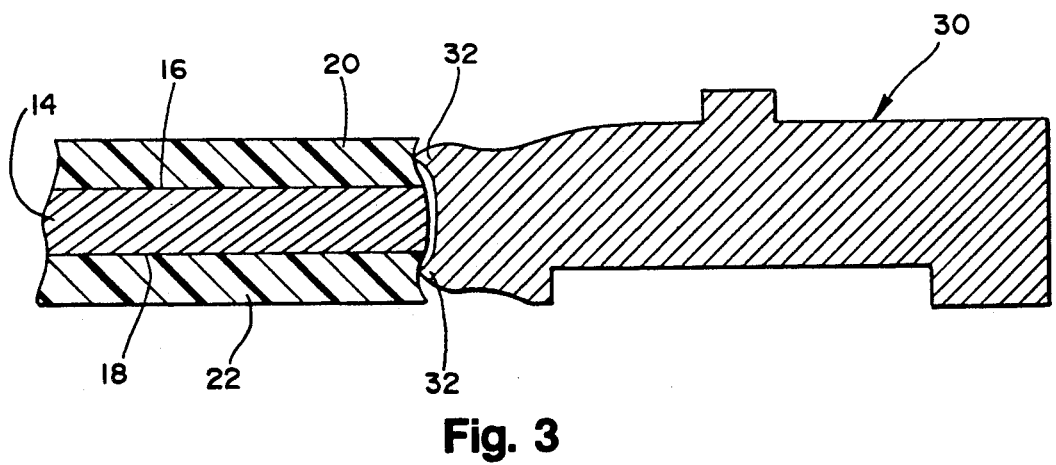
FIG. 3 is an enlarged cross-sectional view taken substantially along line 3—3 of FIG. 2.
Figure 4:
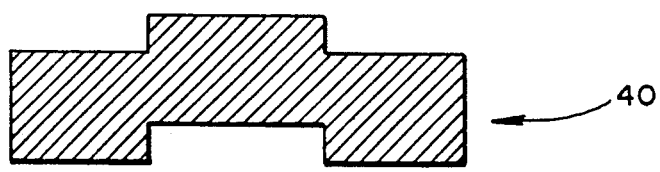
FIGS. 4-7 show alternative fire rings which may be used in place of the fire ring shown in FIG. 3.
Figure 5:
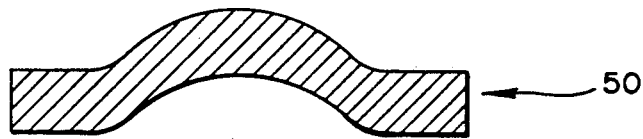
Figure 6:
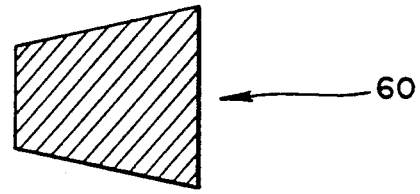
Figure 7:
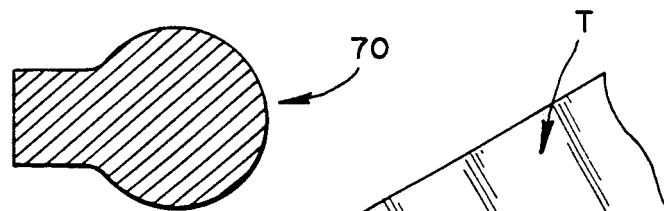

To that end the stakes are most preferably located at included angles A of no more than about thirty degrees (30°) about the center C of a combustion opening and a straight line X which intersects center C and the lengthwise line L at a right angle. That is clearly illustrated in FIG. 2 which shows four stakes 32 which are one of each of the four pairs of stakes in this embodiment which overlie and underlie the upper and lower surfaces of the gasket body, as shown in FIG. 3.

As shown in the drawings, the fire ring 30 may be of a configuration of the type shown and described in U.S. Pat. No. 4,796,897 issued Jan. 10, 1989, the disclosure of which is here incorporated by reference. Alternatively, other fire ring configurations may be used, including fire rings 40, 50, 60 and 70, as illustrated in cross-section by FIGS. 4, 5, 6 and 7, respectively. In each case, the fire rings 40, 50, 60 and 70, like rings 30, are adapted to be positioned in combustion openings and are provided with stakes displaced therefrom to overlie and underlie the main gasket body, thereby to floatingly support the fire rings in associated combustion openings.

A typical head gasket 10 incorporating the gasket assembly just described comprises a gasket body defining six combustion openings 24. The gasket body is about 0.06 inch in thickness, with a metallic core of about 0.03 inch in thickness and fiber-elastomer facings of about 0.015 inch thick. The gasket body is about 30 inches in length and 10 inches wide. The fire ring is about 4.5 inches in outside diameter and 3.7 inches in inside diameter with a main body thickness of about 0.06 inch. The nominal combustion opening diameter of the gasket body is about 0.004 inch per side larger than the fire ring outside diameter, i.e., a diameter of about 0.008 inch greater than the diameter of the combustion opening.

After insertion of the fire rings, they are staked in place, with the stakes located at the outer diameter of the fire rings at included angles of approximately thirty degrees (30°), as the included angles are described above. The stakes are desirably eight in number, pairs of two lying above and below each other at four locations as best illustrated by FIG. 2.

Figure 8:
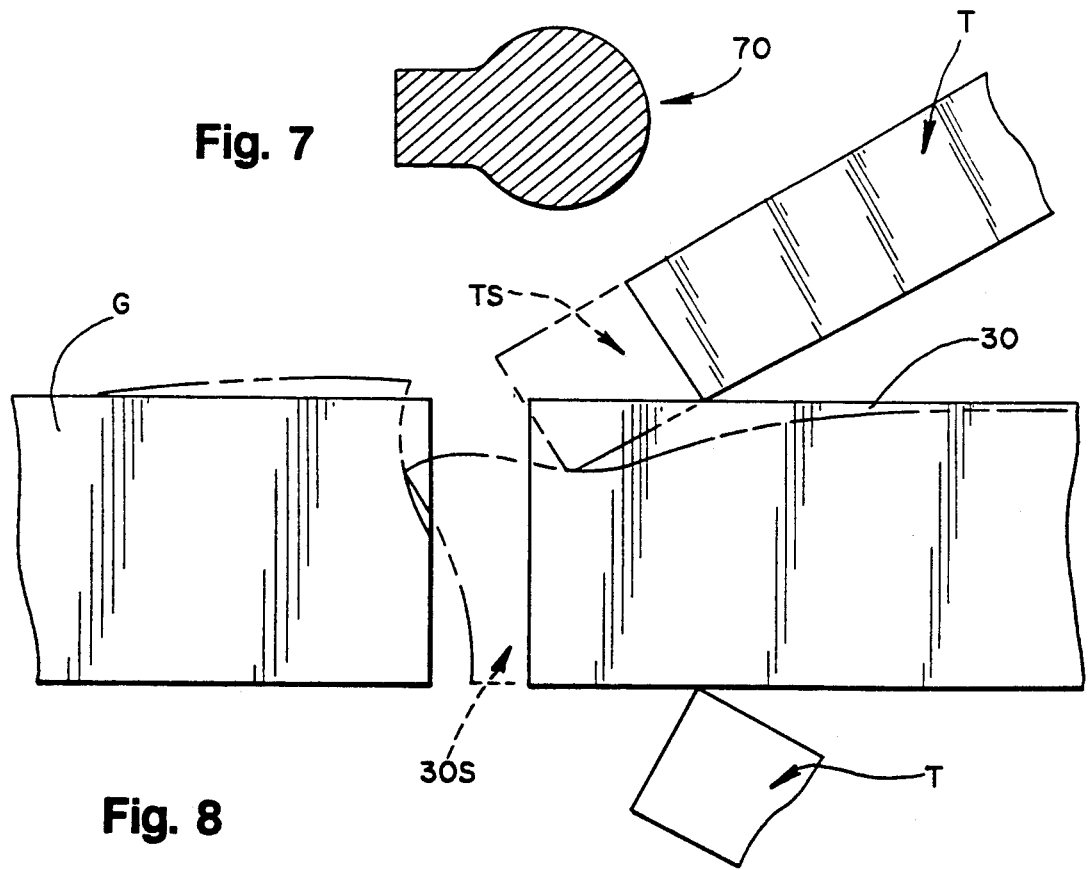
FIG. 8 is a representative view of the displacement caused by illustrative staking tools used in accordance with the process of the present invention.

In a preferred embodiment, as illustrated by FIG. 8, staking tools T were driven along a radius of the fire ring at an angle of about thirty degrees (30°) to the upper and lower surfaces of the fire ring, contacting those surfaces at about 0.02 inch from the outer edge of the fire ring. The driving of the staking tool was continuous and continued until a depth of about 0.015 inch into the fire ring was reached.

A typical displacement of the fire ring body to produce stakes, as modelled on a simulator, and assuming the fire ring was flat, not dished (which may occur as a result of the fire ring forming process), and that all staking tools contacted the fire ring at the same time, is illustrated by FIG. 8. In FIG. 8 the solid lined figure represents a cross-section of a fire ring 30, and the dotted line figure represents the fire ring 30S staked as just described. A staking tool T is shown in solid line in contact with the fire ring 30 and the tool as driven, preferably in a radial direction to form the staked fire ring 30, is shown in dotted line as TS.

As seen in FIG. 8, the displaced stakes extend across any gap between the fire ring and the gasket body G and well into the zone of the adjacent gasket body G, thereby to overlie and underlie the metallic core thereof. If the staking tool is initially positioned too far away from the peripheral edge of the fire ring, material will simply be displaced into the combustion opening to bear against the edge of the body, without providing stakes which serve to floatingly support the fire ring in the opening. If the tool T is placed too close to the edge of the fire ring, it will simply displace material downwardly without causing it to extend across the gap.

As such the staking tool should preferably contact the fire ring at a relatively shallow angle of thirty degrees (30°) or less, and at a distance from the edge of the fire ring equal to about 25% to 40%, and most preferably about.

From the foregoing it will be apparent to those skilled in the art that further modifications may be made and provided without departing from the spirit of the invention. Accordingly, the scope of the invention is to be considered as limited only to the extent made necessary by the claims.

What is claimed:

1. A head gasket for an automotive engine, comprising
    an elongated gasket body comprising a metallic core having upper and lower surfaces,
    a plurality of spaced generally circular combustion openings defined by said gasket body, each said combustion opening having a center, said centers lying along a line extending lengthwise of the gasket body, a metallic fire ring disposed in each combustion opening adjacent the peripheral edge of said combustion opening, and a plurality of stakes integral with and formed from each fire ring by driving and displacing fire ring material outwardly from the body of said fire ring, and into positions overlying and underlying said metallic core to floatingly support said fire ring in an associated combustion opening, and an absence of means for supporting said fire rings in said combustion openings other than the stakes formed solely of material driven and displaced outwardly of the bodies of the fire rings.

2. A head gasket in accordance with claim 1, and wherein said stakes are located at included angles of no more than about thirty degrees about the center of a combustion opening and a straight line which intersects the center of said combustion opening and said lengthwise line at a right angle.

3. A head gasket in accordance with claim 2, and wherein said stakes are radially displaced from the upper and lower surfaces of said fire ring.

4. A head gasket in accordance with claim 2, and wherein said gasket body comprises facing layers on each of said upper and lower surfaces.

5. A head gasket in accordance with claim 1, and wherein there are four pairs of said stakes on each fire ring, one of each of said pairs being disposed above said upper surface and one of each of said pair being disposed below said lower surface.

6. A method of making a head gasket for an automotive engine, comprising the steps of providing an elongated gasket body having a metallic core having upper and lower surfaces, a plurality of spaced generally circular combustion openings defined by said gasket body, each said combustion opening having a center, said centers lying along a line extending lengthwise of the gasket body, disposing a metallic fire ring having no means for supporting it in the combustion opening in each combustion opening adjacent the peripheral edge of said combustion opening, and forming a plurality of stakes integral with each fire ring by driving and displacing fire ring material outwardly from the body of each fire ring to form stakes of fire ring material and into positions to overlie and underlie said metallic core to floatingly support said fire ring in an associated combustion opening.

7. The method of claim 6, and wherein said forming step comprises forming stakes at included angles of no more than about thirty degrees about the center of a combustion opening and a straight line which intersects the center of said combustion opening and said lengthwise line at a right angle.

8. The method of claim 6, and wherein said forming step comprises applying staking tools against the upper and lower surfaces of said fire ring and driving said tools thereagainst to displace stakes radially outwardly from said fire ring.

9. The method of claim 8, and wherein said forming step comprises forming four pairs of said stakes on each fire ring, one of each of said pairs being below said upper surface and one of each of said pairs being below said lower surface.

* * * * *